United States Patent
Nagarathnam

(10) Patent No.: US 12,189,752 B2
(45) Date of Patent: Jan. 7, 2025

(54) MULTIMODAL AUTHENTICATION AND LIVELINESS DETECTION

(71) Applicant: ARRIS Enterprises LLC, Suwanee, GA (US)

(72) Inventor: Yuvaraj Nagarathnam, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 336 days.

(21) Appl. No.: 17/571,679

(22) Filed: Jan. 10, 2022

(65) Prior Publication Data

US 2022/0318362 A1 Oct. 6, 2022

Related U.S. Application Data

(60) Provisional application No. 63/170,062, filed on Apr. 2, 2021.

(51) Int. Cl.
*G06F 21/00* (2013.01)
*G06F 21/32* (2013.01)
*G06F 21/40* (2013.01)

(52) U.S. Cl.
CPC .............. *G06F 21/40* (2013.01); *G06F 21/32* (2013.01)

(58) Field of Classification Search
CPC .......... G06F 21/40; G06F 21/32; G06F 21/36; G06F 2221/2103; H04L 63/0861
See application file for complete search history.

(56) References Cited

U.S. PATENT DOCUMENTS

| | | | |
|---|---|---|---|
| 8,856,541 B1 * | 10/2014 | Chaudhury | G06V 40/67 726/16 |
| 9,430,629 B1 | 8/2016 | Ziraknejad et al. | |
| 11,256,792 B2 * | 2/2022 | Tussy | G06V 40/70 |
| 2018/0232591 A1 * | 8/2018 | Hicks | G06F 21/32 |
| 2019/0080065 A1 * | 3/2019 | Sheik-Nainar | G06V 40/40 |
| 2019/0205680 A1 * | 7/2019 | Miu | G06V 40/45 |
| 2020/0097643 A1 * | 3/2020 | Uzun | G06V 40/40 |
| 2020/0134148 A1 | 4/2020 | Mortazavian et al. | |

OTHER PUBLICATIONS

International Preliminary Report on Patentability and Written Opinion issued Oct. 12, 2023 in International Application No. PCT/US2022/011750.
International Search Report and the Written Opinion of the International Searching Authority dated Apr. 8, 2022 in International (PCT) Application No. PCT/US2022/011750.

* cited by examiner

*Primary Examiner* — Ghazal B Shehni
(74) *Attorney, Agent, or Firm* — Wenderoth, Lind & Ponack, L.L.P.

(57) ABSTRACT

A robust and reliable multimodal authentication is provided by a multimodal authentication device. The multimodal authentication device utilizes an audio authentication, a video authentication, an audio liveliness authentication, and a video liveliness authentication to determine the authentication of a user. By including a liveliness component in the authentication determination reduces the risk of fraud by factoring in live movement and orientation into the authentication determines. For example, various image/location combinations are displayed to the user and the user is instructed to track and verbally identify the various images. In this way, the user is authenticated based not only on, for example, facial and audio recognition but also a liveliness associated with each.

20 Claims, 8 Drawing Sheets

MULTIMODAL AUTHENTICATION AND LIVELINESS DETECTION

BACKGROUND

Security continues to be a key concern for protection and authorization of devices. Voice based authentication is becoming prevalent and is being used by authentication programs for highly secure systems such as banking via telephone. Similarly, video based authentication is also becoming more prevalent with the continued popularity of user devices such as mobile phones. Authorization techniques prevent illicit or malicious attacks on devices by utilizing these voice or video techniques. However, security attacks are overcoming or infiltrating these security authorization techniques. Therefore, there is a need to provide improved authentication of a user prior to providing authorization to that user for access to a device, a service and/or a resource.

SUMMARY

According to aspects of the present disclosure there are provided novel solutions for multimodal authentication of a user prior to providing authorization to the user to access a device. For example, access to many devices, such as network devices connected to a network, requires enhanced security to prevent the inadvertent or malicious access to sensitive data especially given the advent of telecommuting and telehealth. While video based authentication and voice based authentication techniques have become prevalent to provide highly secure systems, these techniques are increasingly susceptible to security attacks, including spoofing attacks. Voice spoofing is a process where the user's voice is spoofed to gain access to unauthorized devices, services, and/or resources through, for example, recording, playing-back and/or remodulating a voice signal to emulate a user's voice. Video spoofing is a process where a photo, a video, a mask or other resemblance to or feature of a user is substituted for an actual video of the user, for example, a substitute for a user's face. To overcome these deficiencies and security risks, a multimodal technique can be implemented that uses not only voice and video, but also a visual and/or audio liveliness detection. Such multimodal liveliness authentication improves security for a device so as to preclude access to the device by unauthorized users.

An aspect of the present disclosure provides a multimodal authentication device to provide a multimodal authentication. The multimodal authentication device comprising a memory storing one or more computer-readable instructions and a processor configured to execute the one or more computer-readable instructions to perform one or more operations to display one or more images at one or more locations of a display device associated with the multimodal authentication device, receive one or more user images of a user in response to the display of the one or more images, wherein the user image is received from an image capture device associated with the multimodal authentication device, receive one or more user audio inputs in response to the display of the one or more images, wherein the user audio is received from an audio capture device, determine a visual authentication based on the one or more user images, determine a visual liveliness authentication based on the one or more user images, determine an audio authentication based on the one or more user audio inputs, determine an audio liveliness authentication based on the one or more user audio inputs, provide a multimodal authentication based on the visual authentication, the visual liveliness authentication, the audio authentication, and the audio liveliness authentication.

In an aspect of the present disclosure, the processor is further configured to execute the one or more computer-readable instructions to perform one or more further operations to generate a location random number series, wherein the one or more locations are based on the location random number series and generate an image random number series, wherein the one or more images are based on the image random number series.

In an aspect of the present disclosure, the processor is further configured to execute the one or more computer-readable instructions to perform one or more further operations to set a visual authentication result based on the visual authentication, set a visual liveliness authentication result based on the visual liveliness authentication, set an audio authentication result based on the audio authentication, and set an audio liveliness authentication result based on the audio liveliness authentication.

In an aspect of the present disclosure, the processor is further configured to execute the one or more computer-readable instructions to perform one or more further operations to compare the visual authentication result to a visual authentication result threshold, compare the visual liveliness authentication result to a visual liveliness authentication threshold, compare the audio authentication result to an audio authentication result threshold, and compare the audio liveliness authentication result to an audio liveliness authentication result threshold, wherein providing the multimodal authentication is further based on each of the comparisons.

In an aspect of the present disclosure, wherein the determining the visual liveliness authentication comprises at least one of determining a face angle associated with the one or more user images and determining a gaze angle associated with the one or more user images.

In an aspect of the present disclosure, wherein the determining the visual liveliness authentication further comprises at least one of determining that the face angle tracks the displaying of the one or more images at each of the one or more locations and determining that the gaze angle tracks the displaying of the one or more images at each of the one or more locations.

In an aspect of the present disclosure, the processor is further configured to execute the one or more computer-readable instructions to perform one or more further operations to provide one or more instructions at the display device, receive a user input in response to the displaying the one or more instructions, and wherein the displaying the one or more images is based on the user input.

An aspect of the present disclosure provides a method for multimodal authentication device to provide a multimodal authentication. The method comprises displaying one or more images at one or more locations of a display device associated with the multimodal authentication device, receiving one or more user images of a user in response to the display of the one or more images, wherein the user image is received from an image capture device associated with the multimodal authentication device, receiving one or more user audio inputs in response to the display of the one or more images, wherein the user audio is received from an audio capture device, determining a visual authentication based on the one or more user images, determining a visual liveliness authentication based on the one or more user images, determining an audio authentication based on the one or more user audio inputs, determining an audio liveliness authentication based on the one or more user audio inputs, and providing a multimodal authentication based on the visual authentication, the visual liveliness authentication, the audio authentication, and the audio liveliness authentication.

In an aspect of the present disclosure, the method further comprises generating a location random number series, wherein the one or more locations are based on the location random number series and generating an image random number series, wherein the one or more images are based on the image random number series.

In an aspect of the present disclosure, the method further comprises setting a visual authentication result based on the visual authentication, setting a visual liveliness authentication result based on the visual liveliness authentication, setting an audio authentication result based on the audio authentication, setting an audio liveliness authentication result based on the audio liveliness authentication.

In an aspect of the present disclosure, the method further comprises comparing the visual authentication result to a visual authentication result threshold, comparing the visual liveliness authentication result to a visual liveliness authentication threshold, comparing the audio authentication result to an audio authentication result threshold, and comparing the audio liveliness authentication result to an audio liveliness authentication result threshold.

In an aspect of the present disclosure, the method such that the determining the visual liveliness authentication comprises at least one of determining a face angle associated with the one or more user images and determining a gaze angle associated with the one or more user images.

In an aspect of the present disclosure, the method such that the determining the visual liveliness authentication further comprises at least one of determining that the face angle tracks the displaying of the one or more images at each of the one or more locations and determining that the gaze angle tracks the displaying of the one or more images at each of the one or more locations.

In an aspect of the present disclosure, the method further comprises providing one or more instructions at the display device, receiving a user input in response to the displaying the one or more instructions, and wherein the displaying the one or more images is based on the user input.

An aspect of the present disclosure provides a non-transitory computer-readable medium of a multimodal authentication device storing one or more instructions for providing a multimodal authentication. The one or more instructions when executed by a processor of the multimodal authentication device, cause the multimodal authentication device to perform one or more operations including the steps of the methods described above.

The above-described novel solution may be implemented at a multimodal authentication and liveliness detection system that includes one or more devices, such as a multimodal authentication device, according to one or more example embodiments.

Thus, according to various aspects of the present disclosure described herein, it is possible to provide a multimodal authentication of a user based on audio, visual/video, a liveliness factor, or any combination thereof. In particular, the novel solution provides improvements to the security of a device by requiring enhanced authentication based on not only multimodal factors but also a liveliness factor.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
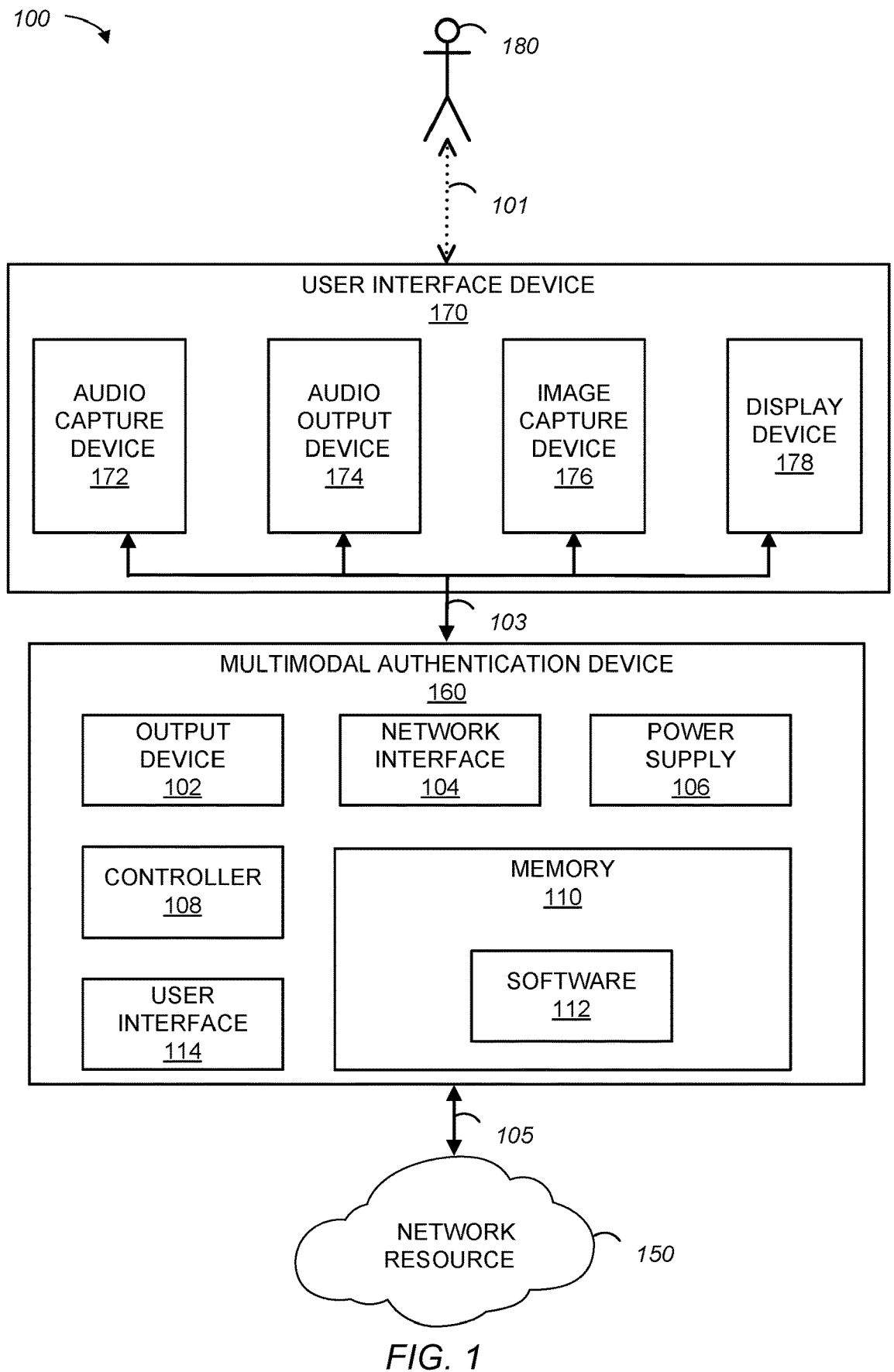
FIG. 1 is a schematic diagram of a multimodal authentication system, according to one or more aspects of the present disclosure.

FIG. 1 is a schematic diagram of a multimodal authentication system 100, according to one or more aspects of the present disclosure. It should be appreciated that various example embodiments of inventive concepts disclosed herein are not limited to specific numbers or combinations of devices, and there may be one or multiple devices in the multimodal authentication system 100, which may itself consist of multiple communication networks and various known or future developed wireless connectivity technologies, protocols, devices, and the like. The multimodal authentication system 100 can include a user 180 in proximity 101 of a user interface device 170 coupled via connection 103 to a multimodal authentication device 160 that can access a network resource 150 via a connection 105.

A user 180 within the multimodal authentication system 100 may request access to one or more devices, one or more resources, and/or one or more services, for example, one or more resources and/or one or more services provided by a network resource 150, a multimodal authentication device 160, any other device, or a combination thereof, that require a multimodal authentication by a multimodal authentication device 160. The multimodal authentication device 160 can include one or more elements including, but not limited to, any of an output device 102, a network interface 104, a power supply 106, a controller 108, a memory 110, a user interface 114, any other element, or a combination thereof.

The output device 102 can comprise any device that provides for the playback and/or reproduction of any of audio, video, multimedia content, any other content, or any combination thereof, for example, to a user 180 within proximity 101 including, but not limited to, any of a speaker, a sound bar, a display (such as a television, a monitor, a projector, and/or any other audio playback device, video playback device, or both), any other device that is capable of providing multi-media content for consumption by a user 180, or any combination thereof. For example, output device 102 can output an audio authentication command, a visual and/or audio liveliness authentication scheme.

The network interface 104 can include, but is not limited to, various network cards, interfaces, and circuitry implemented in software and/or hardware to enable communications with any of one or more elements of user interface device 170, network resource 150, any other device, or a combination thereof using the communication protocol(s) in accordance with any connection, for example, connection 103 and 105. The power supply 106 supplies power to any one or more of the internal elements of the multimodal authentication device 160, for example, through an internal bus. The power supply 106 can be a self-contained power source such as a battery pack with an interface to be powered through an electrical charger connected to an outlet (for example, either directly or by way of another device). The power supply 106 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The controller 208 controls the general operations of the multimodal authentication device 160 and can comprise any of or any combination of a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of computer-readable instructions, algorithms, or software including the software 112 stored in memory 110 for controlling the operation and functions of the multimodal authentication device 160 in accordance with the embodiments described in the present disclosure. Communication between any of the element (for example, elements 102, 104, 106, 110, 112, and/or 114) of the multimodal authentication device 160 can be established using an internal bus.

The memory 110 can comprise a single memory or one or more memories or memory locations that can include, but are not limited to, any of a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical drive, a hard disk or any other various layers of memory hierarchy. The memory 110 can be used to store any type of computer-readable instructions, software, or algorithms including software 112 for controlling the general function and operations of the multimodal authentication device 160 in accordance with the embodiments described in the present disclosure. In one or more embodiments, software 112 includes one or more applications and/or computer-readable instructions for providing multimodal authentication.

The user interface 114 can comprise any of one or more tactile inputs (for example, a push button, a selector, a dial, etc.), a camera, a keyboard, an audio input, for example, a microphone, a keypad, a liquid crystal display (LCD), a thin film transistor (TFT), a light-emitting diode (LED), a high definition (HD) or other similar display device including a display device having touch screen capabilities so as to allow interaction between one or more users 180 and the multimodal authentication device 160, or a combination thereof.

In one or more embodiments, the multimodal authentication device is coupled or connected to a user interface device 170 via a connection 103 so as to provide and/or receive audio and/or visual inputs and/or outputs to and/or from a user 180 within a proximity 101. In one or more embodiments, the user interface device 170 or one or more elements of the user interface device 170 are incorporated within or as part of the multimodal authentication device 160. The user interface device 170 can comprise an audio capture device 172, an audio output device 174, an image capture device 176, a display device 178, any other element, or any combination thereof.

The audio capture device 172 can, for example, comprise a microphone or any other device that can receive and/or record audio or sound, for example, a voice of user 180. The audio output device 174 can be similar to or the same as one or more components of the output device 102. The audio output device 174 can comprise, for example, a speaker or any other device that can output an audio or a sound. The image capture device 176 can, for example, comprise a camera or any other device that can receive and/or record an image. The display device 178 can be similar to or the same as one or more components of the output device 102. The display device 178 can comprise, for example, a display or any other device that can output an image and/or content.

In one or more embodiments any of connection 103 or connection 105 can be a bidirectional communication link such that any one or more communications or messages can be sent and/or received by any of the multimodal authentication device 160, the multimodal authentication device 160, the user interface device 170, or any combination thereof. A connection 103 or a connection 105 can be a wired and/or wireless connection.

Further, any, all, or some of the electronic elements or electronic computing devices can be adapted to execute any operating system, including Linux, UNIX, Windows, MacOS, DOS, and ChromOS as well as virtual machines adapted to virtualize execution of a particular operating system, including customized and proprietary operating systems. Any, all or some of the electronic components or electronic computing devices are further equipped with components to facilitate communication with other devices over the one or more network connections to local and wide area networks, wireless and wired networks, public and private networks, and any other communication network enabling communication in the multimodal authentication system 100.

Figure 2:
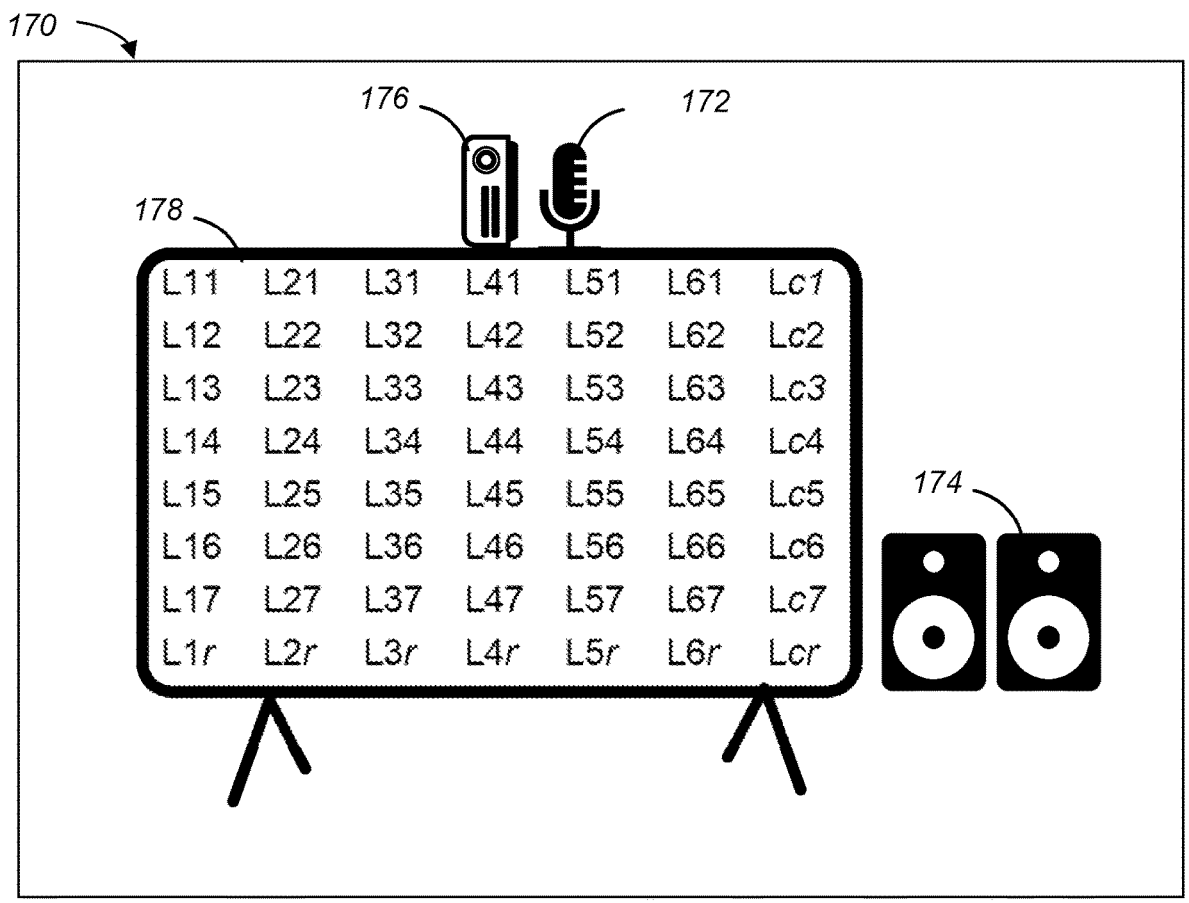
FIG. 2 is a block diagram of a multimodal authentication device, according to one or more aspects of the present disclosure.
Figure 3:
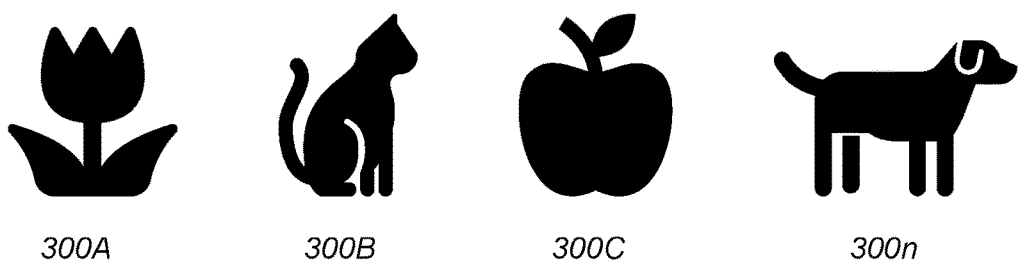
FIG. 3 illustrates an exemplary liveliness authentication images, according to one or more aspects of the present disclosure.

FIG. 2 is a block diagram of a multimodal authentication device 160, according to one or more aspects of the present disclosure. In one or more embodiments, a multimodal authentication device 160 can comprise and/or be connected to a user interface device 170 and/or one or more elements of a user interface device 170. While the elements 172, 174, 176 and 178 are illustrated as separate elements, the present disclosure contemplates that any one or more of these elements can be integrated as a single element. A display device 178 (such as a television) can display one or more images at one or more locations such as one or more locations L11 through Lcr, where c represents column number c and r represents row number where a display device 178 can comprise any number of rows and columns. The multimodal authentication device 160 can cause one or more images, for example, any one or more of images 300A-300n (collectively referred to as image(s) 300) of FIG. 3, where n represents any number of images 300, to be displayed at any one or more locations L11 through Lcr. The one or more images 300 can be stored in a memory 110, received or pulled from a network resource 150, or both. The display of an image 300 can be used by the multimodal authentication device 160 to authenticate a user as part of, for example, any of an audio authentication, an audio liveliness authentication, a visual authentication, a visual liveliness authentication, or any combination thereof. For example, the one or more images 300 can be selected based on any one or more factors, such as any of an ease of pronunciation of the corresponding identifier associated with the image 300 (such as illustrated in Table 1), number of syllables of the corresponding identifier with the image 300, familiarity or popularity of the image 300 (such as international symbols), ease of depiction or clarity of the image 300, selected language for the authentication (such as English, Spanish, Mandarin, German, etc.), age or age range of a user, educational level of a user, any other factor, or any combination thereof.

TABLE 1

| Imaged | Identifier |
| --- | --- |
| 300A | Flower |
| 300B | Cat |
| 300C | Apple |
| 300n | Dog |

Figure 4A:
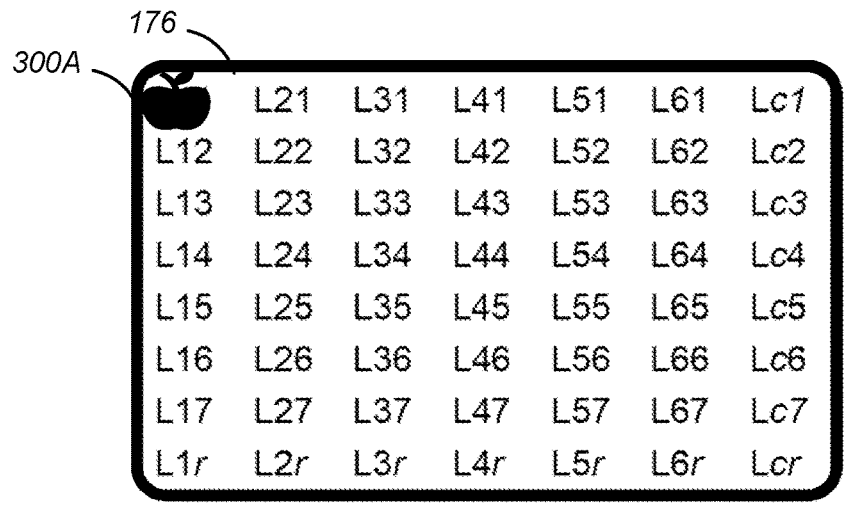
FIGS. 4A-4C illustrate an exemplary liveliness authentication scheme, according to one or more aspects of the present disclosure.
Figure 4B:
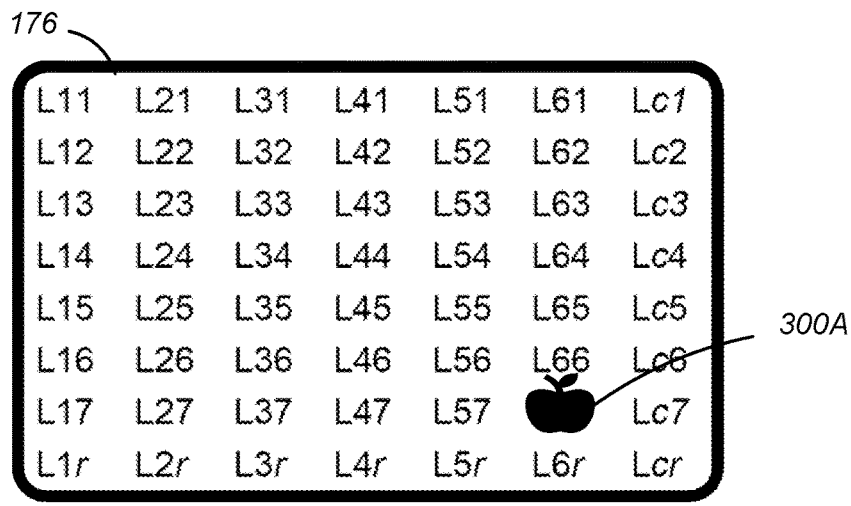
Figure 4C:
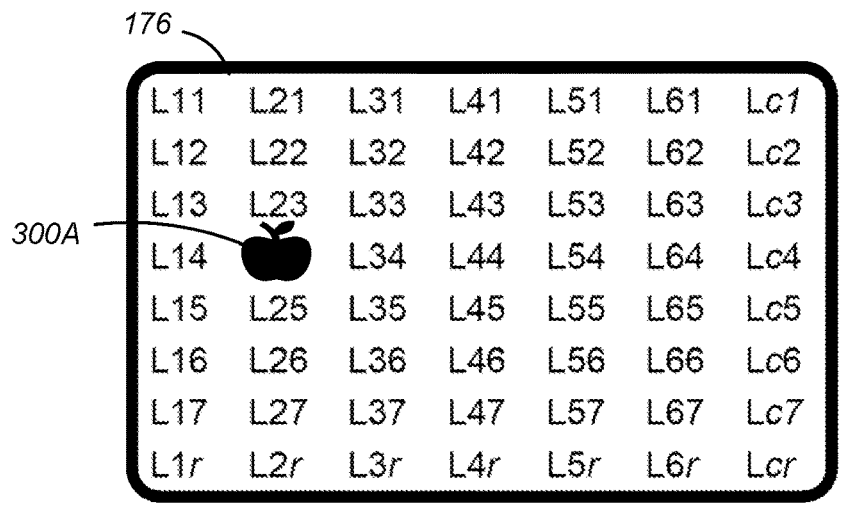

FIGS. 4A-4C illustrate an exemplary liveliness authentication scheme, according to one or more aspects of the present disclosure. As an example of a liveliness authentication scheme, a multimodal authentication device 160 can cause an image 300A to be initially displayed at a location L11 (such as location row 1, column 1), for example, of a display device 178 as illustrated in FIG. 4A. The multimodal authentication device 160 can instruct a user, such as user 180, to vocally identify or provide any other auditory response, for example, by outputting audio via the audio output deice 174, the image 300A. The image 300A can be transitioned to a location L67 (such as location column 6, row 7) as illustrated in FIG. 4B and then to a location L24 (such as location column 2, row 4) as illustrated in FIG. 4C. At each location, the multimodal authentication device 160 can receive and/or record the audio from the user 180, for example, via an audio capture device 172 so as to determine an audio authentication, an audio liveliness authentication, or both. The multimodal authentication device 160 can also track or record any facial orientation, for example, an eye movement (such as an eye transition or a gaze), a facial angle, a facial tilt, any other facial positioning, or any combination thereof of a user 180, for example, via an input received from an image capture deice 176 so as to determine a visual authentication, a visual liveliness authentication, or both.

Figure 5A:
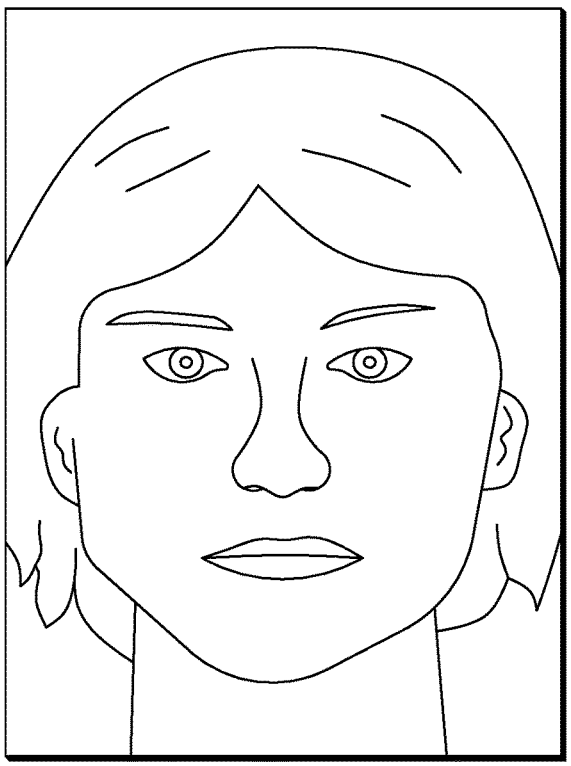
FIGS. 5A-5D illustrate an exemplary liveliness authentication scheme, according to one or more aspects of the present disclosure.
Figure 5B:
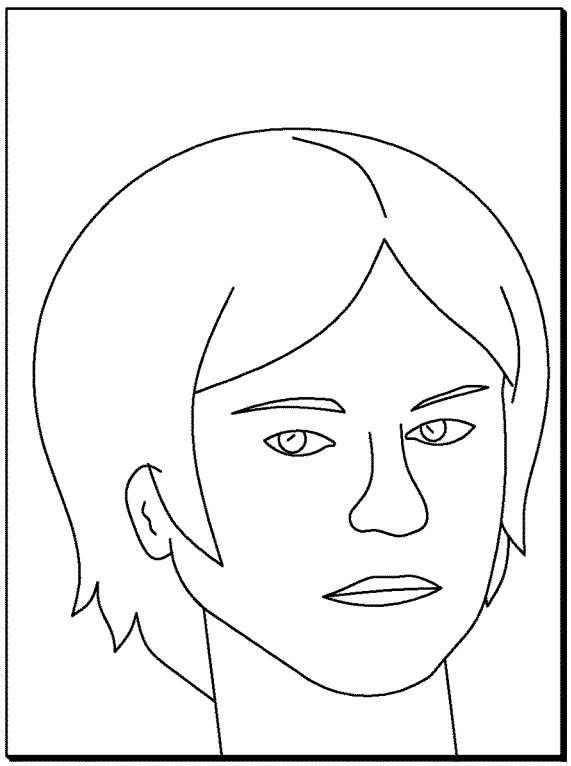
Figure 5C:
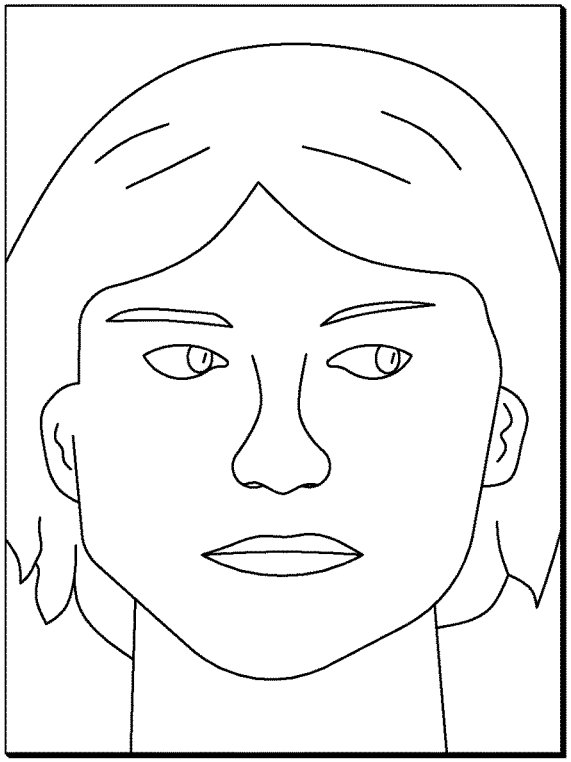
Figure 5D:
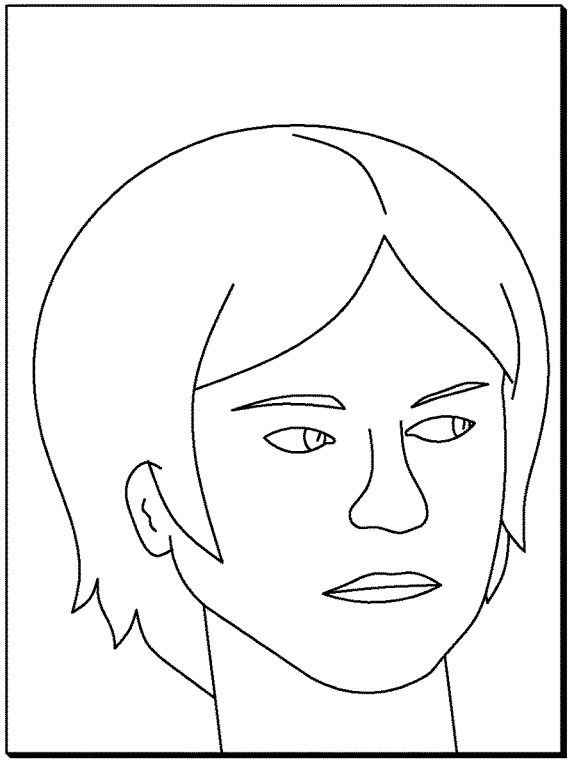

FIGS. 5A-5D illustrate an exemplary liveliness authentication scheme, according to one or more aspects of the present disclosure. As discussed with reference to FIGS. 4A-4C, the multimodal authentication device 160 can track facial orientation of a user 180 within proximity of the multimodal authentication device 160, a user interface device 170, or both. For example, a user 180 can initially have a gaze (eye positioning) looking straight towards an object, such as illustrated in FIGS. 5A and 5B or at an angle, such as illustrated in FIGS. 5C and 5D. As an example, an image 300 can be displayed at a first location with a first facial orientation of the user 180 of FIG. 5A and at a second location with a second facial orientation of the user 180 of FIG. 5C. As an example, an image 300 can be displayed at a third location with a third facial orientation of the user 180 of FIG. 5B and at a fourth location with a fourth facial orientation of the user 180 of FIG. 5D. In one or more embodiments, the facial orientation of the user 180 can change, for example, from an angle of FIG. 5A to the angle of FIG. 5D, FIG. 5B to FIG. 5C, or any other angle or orientation. The gaze and/or orientation can be utilized by the multimodal authentication device to determine any of an audio authentication, an audio liveliness authentication, a visual authentication, a visual liveliness authentication, or any combination thereof.

Figure 6:
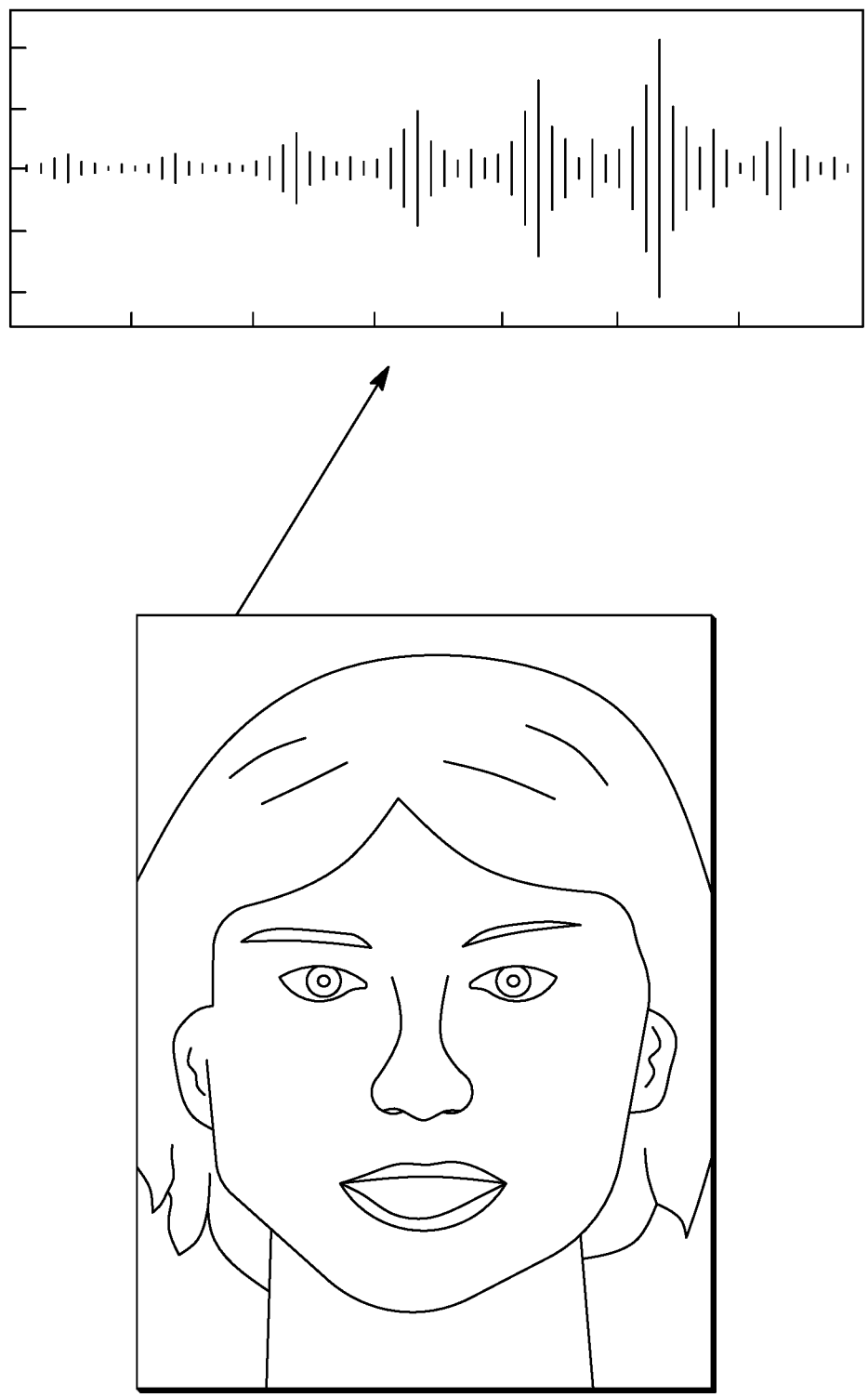
FIG. 6 illustrates an exemplary liveliness authentication scheme, according to one or more aspects of the present disclosure.

FIG. 6 illustrates an exemplary liveliness authentication scheme, according to one or more aspects of the present disclosure. A user 180 can be within proximity of a multimodal authentication device 160 and receive an instruction to vocally identify an image 300. The vocal identification can be received or recorded by the multimodal authentication device 160. For example, the vocalization (the audio) by the user 180 can be captured (such as received or recorded) by an audio capture device 172 as an analog signal 160 while the lip movement can be captured (such as received or recorded) by an image capture device 176. The captured audio and video can be used by the multimodal authentication device 160 to determine any of an audio authentication, an audio liveliness authentication, a visual authentication, a visual liveliness authentication, or any combination thereof.

Figure 7:
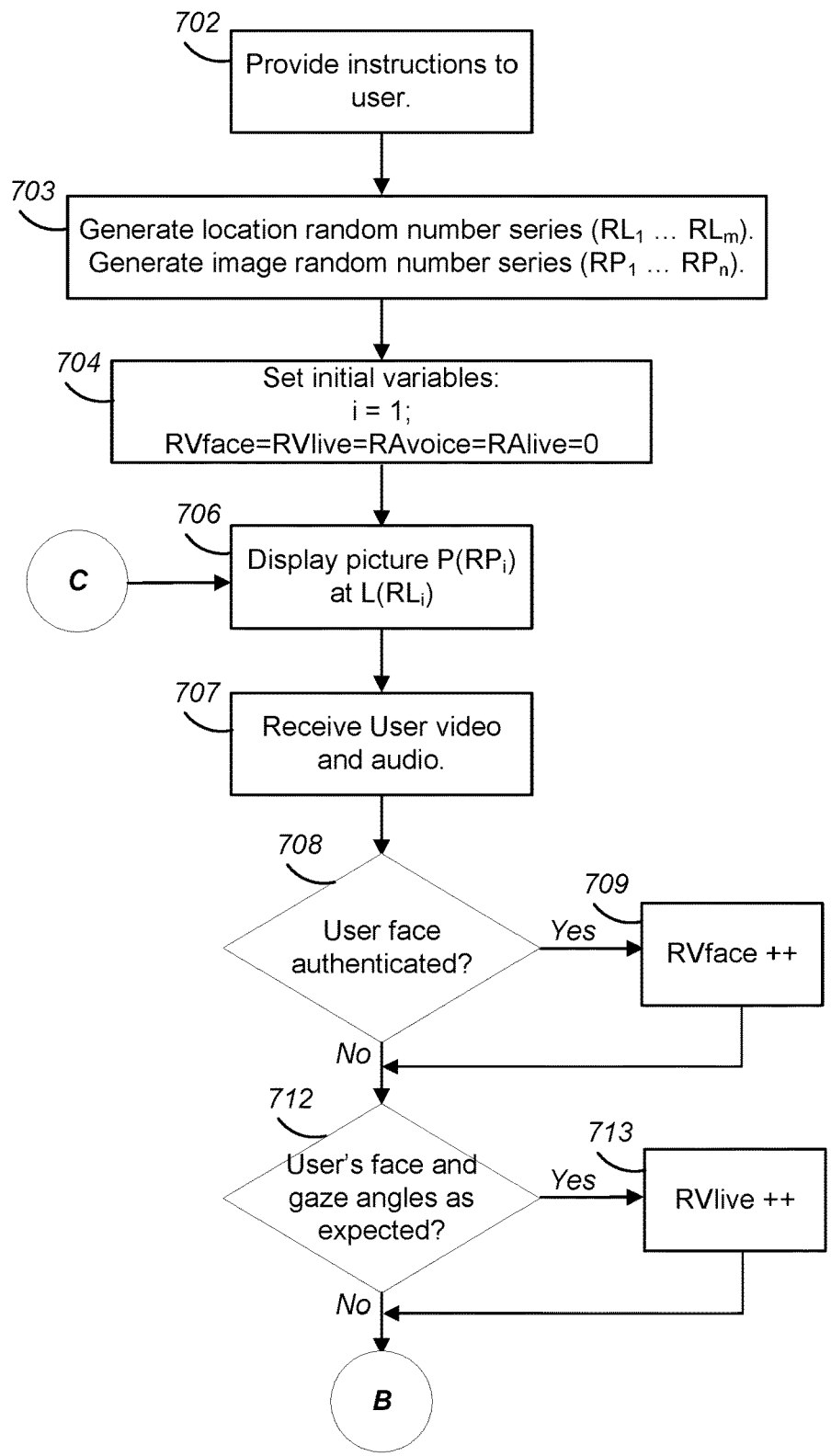
FIG. 7 illustrates a flow diagram of a multimodal authentication by a multimodal authentication device, according to one or more aspects of the present disclosure.
Figure 7:
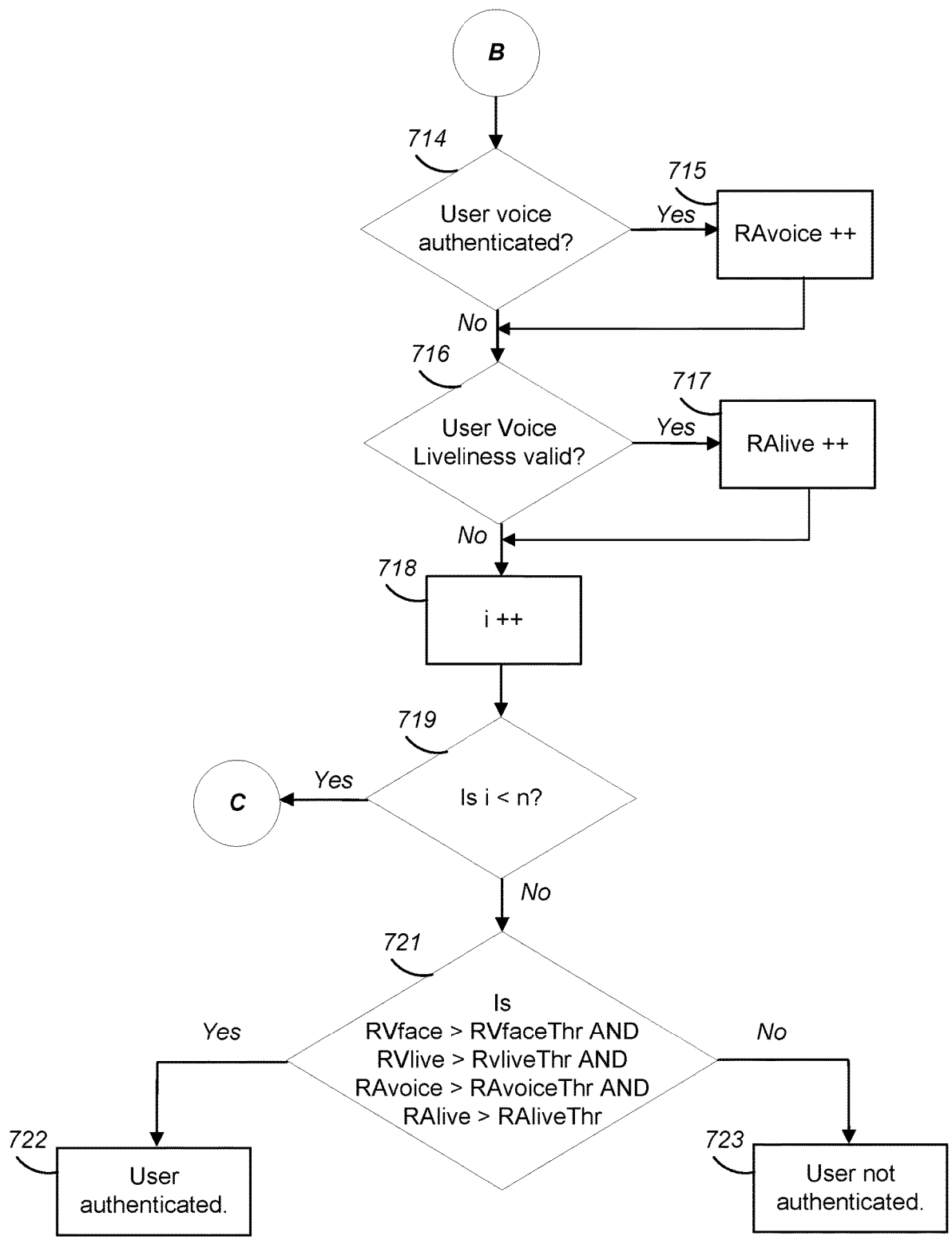

FIG. 7 illustrates a flow diagram of providing a multimodal authentication by a multimodal authentication device 160, according to one or more aspects of the present disclosure. While the steps 702-723 are presented in a certain order, the present disclosure contemplates that any one or more steps can be performed simultaneously, substantially simultaneously, repeatedly, in any order or not at all (omitted).

At step 702, a user 180 within a proximity 100 of a multimodal authentication device 160, a user interface device 170, or both is provided instructions for a liveliness authentication scheme. For example, a user can be within proximity of a television and be instructed visually, auditorily or both on how to proceed with authentication so that the user has access to one or more devices, one or more services, and/or one or more resources associated with a device, such as any of a multimodal authentication device 160, a network resource 150, any other device, or a combination thereof. The instructions can provide the user 180 with the requirements of the liveliness authentication scheme, for example, that the user 180 must identify verbally or orally (say aloud) a displayed image 300.

At step 703, a location random number series $RL_1$ through $RL_m$ and an image (such as a picture) random number series $RP_1$ through $RP_n$ are generated where m and n represent any value. RL represents a location for display of an image 300 and RP represents an image 300 selected from a plurality of images 300. For example, $RP_1$ can correspond to a first image 300A displayed at $RL_1$ that can correspond to a first location L11, $RP_2$ can correspond to a second image 300B displayed at $RL_2$ that can correspond to a second location L67, and $RP_3$ can correspond to a third image 300n displayed at RL$_n$ that can correspond to a third location L24. In this way, not only are the images 300 selected randomly but the location for display of the images 300 are randomly selected. In one or more embodiments, only a single image is selected for display at various locations, no two identical images are displayed at various locations, or any combination of images can be displayed at the various locations.

At step 704, initial variables required for determination a multimodal authentication are initialized or set. For example, one or more counters are set to a predetermined value such as a "1" or a "0". An initial counter (i) is set to, for example, a "1". An initial result of a video authentication (RVface), an initial result of a video liveliness authentication (RVlive), an initial result of an audio of a voice authentication (RAvoice), and an initial value of a result of an audio liveliness authentication (RAlive) are each set to, for example, a "0".

At step 706, the multimodal authentication device 160 displays a selected image (P(RP$_i$)) at a location on a display device (L(RL$_i$)), for example, as illustrated in FIGS. 4A-4C. At step 707, as the selected image is displayed a user's gaze and/or orientation is captured, for example, an audio input and/or a video input is received by the multimodal authentication device 160. For example, the instructions at step 701 can indicate that a user is to speak the identifier associated with the displayed image, such as illustrated in Table 1. The multimodal authentication device 160 captures the angle, the orientation, and/or the audio from the user.

At step 708, the multimodal authentication device 160 determines if the user is authenticated based on a visual data, for example, based on a facial recognition algorithm. In one or more embodiments, the captured or received video data is compared to a stored image of a user. If the user is visually authenticated, the process continues at step 709 where the variable RVface is incremented. The process continues at step 712, where a visual liveliness authentication is determined, for example, multimodal authentication device 160 can determine if the user's face, gaze, and/or orientation is as expected. If a visual liveliness authentication is determined, at step 713 the variable RVlive is incremented. The process continues at step 714 where the multimodal authentication device 160 determines if the captured audio is authenticated, for example, by comparing a received vocal or audio input to a previously stored or retrieved audio input associated with the user. If the audio input is authenticated, then at step 715 the variable RAvoice is incremented. The process continues at step 716 where the multimodal authentication device 160 determines if an audio liveliness is authenticated. For example, one or more video and audio inputs are processed such that the one or more timestamps associated with the start of the user's lip movement from the captured video and one or more timestamps associated with the start of a command from the captured audio are compared to determine if the timestamps match. As an example, the timestamp of the lip movements is compared with the timestamp that one or more vowels are spoken and checked to determine if a match exists. In this way, an audio liveliness authentication is determined. If the audio voice liveliness is authenticated, the variable RAlive is incremented.

The process continues at step 718 where the variable i (such as an iteration counter) is incremented. At step 719 it is determined if the number of iterations through the process (i) has reached the number of image/location combinations (n). The process proceeds to step 706 if additional image/location combinations remain and to step 721 otherwise. At step 721, the multimodal authentication device 160 compares the variables to a threshold value, for example, to determine if the variable have reached and/or exceeded a threshold value associated with the values. For example, RVface is compared to an RVface threshold (RVfaceThr), RVlive is compared to an RVlive threshold (RVliveThr), RAvoice is compared to a RAvoice threshold (RAVoiceThr) and RAlive is compared to an RAlive threshold (RAlive). If through the number of iterations (i) the variables do not meet a threshold standard, the process continues at step 723 where the user is not authenticated and thus is not permitted access to one or more devices, one or more services, and/or one or more resources. Otherwise, the process continues at step 722 where the user is authenticated and allowed to access one or more services or resources. In one or more embodiments, the user is informed of the authentication visually, auditorily, or both, for example, via the user interface device 170, an out device 102, a user interface 114, or any combination thereof.

Figure 8:
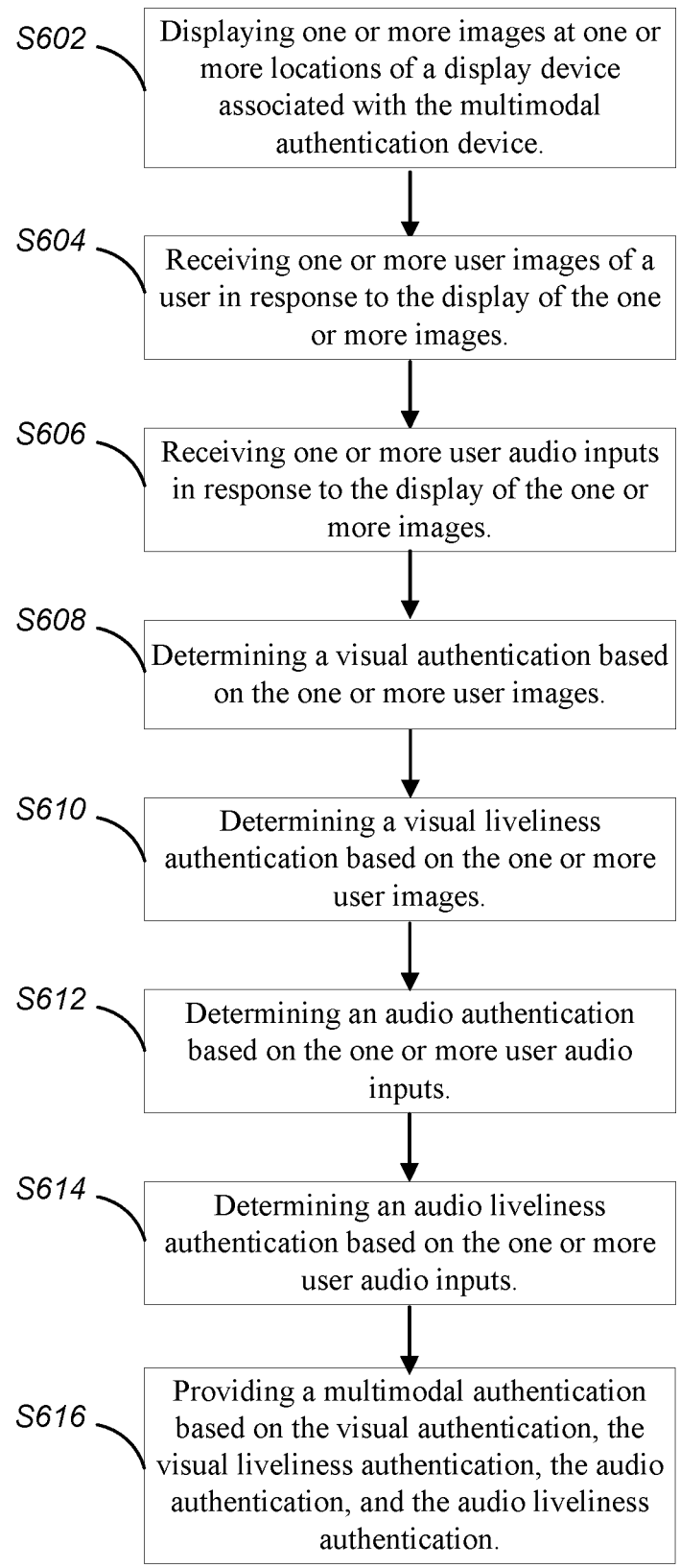
FIG. 8 illustrates a flow diagram of a method of a multimodal authentication device for providing multimodal authentication, according to one or more aspects of the present disclosure.

FIG. 8 illustrates a flow diagram of a method of a multimodal authentication device 170 for providing multimodal authentication, according to one or more aspects of the present disclosure. In FIG. 8, it is assumed that any one or more of the devices include their respective controllers and their respective software stored in their respective memories, as discussed above in connection with any of FIGS. 1-7, which when executed by their respective controllers perform the functions and operations in accordance with the example embodiments of the present disclosure (for example, including performing a configuration of one or more network devices). While the steps S602-S612 are presented in a certain order, the present disclosure contemplates that any one or more steps can be performed simultaneously, substantially simultaneously, repeatedly, in any order or not at all (omitted).

At step S602, a multimodal authentication device 160 provides a multimodal authentication that includes a liveliness determination by displaying one or more images, such as one or more images stored in a memory 110 or received from a network resources 150, at one or more locations of a display device 178 associated with the multimodal authentication device 160. In one or more embodiments, the display device 178 is integrated within or as part of the multimodal authentication device 160. In one or more embodiments, a location random number series is generated with the one or more locations being based on the location random number series and an image random number series is generated with the one or more images for display at the one or more locations being selected based on the image random number series. In one or more embodiments, prior to displaying the one or more images, the multimodal authentication device 160 provides one or more instructions at the display device 178, an audio output device 174, or both. In response to the instructions, the multimodal authentication device 160 can receive a user input wherein displaying the one or more images is based on the user input. For example, the user input can be associated with a language, a genre, an education level, an age level, any other criteria, or any combination thereof.

At step S604, the multimodal authentication device 160 receives one or more user images of a user 180 in response to the display of the one or more images at step S602. The user image is received from an image capture device 176 that is associated with the multimodal authentication device. In one or more embodiments, the image capture device 176 is integrated within or as part of the multimodal authentication device 160.

At step S606, the multimodal authentication device 160 receives one or more audio inputs in response to the display of the one or more images at step S602. The user audio is received from an audio capture device 172 associated with the multimodal authentication device 160. In one or more embodiments, the audio capture device 172 is integrated within or as part of the multimodal authentication device 160.

At step S608, the multimodal authentication device 160 determines a visual authentication based on the one or more user images. A visual authentication result can be set based on the visual authentication. At step S610, the multimodal authentication device 160 determines a visual liveliness authentication based on the one or more user images. The determining the visual liveliness authentication can comprise at least one of determining a face angle associated with the one or more user images and determining a gaze angle associated with the one or more user images. The determining the visual liveliness authentication can further comprise at least one of determining that the face angle tracks the displaying of the one or more images at each of the one or more locations, and determining that the gaze angle tracks the displaying of the one or more images at each of the one or more locations. A visual liveliness authentication result can be set based on the visual liveliness authentication. At step S612, the multimodal authentication device 160 determines an audio authentication based on the one or more user audio inputs. An audio authentication result can be set based on the audio authentication. At step S612, the multimodal authentication device 160 determines an audio liveliness authentication based on the one or more audio inputs. An audio liveliness authentication result can be set based on the audio liveliness authentication.

At step S616, the multimodal authentication device 160 provides a multimodal authentication based on the visual authentication, the visual liveliness authentication, the audio authentication, and the audio liveliness authentication. The multimodal authentication can comprise or be based on each of comparing the visual authentication result to a visual authentication result threshold, comparing the visual liveliness authentication result to a visual liveliness authentication threshold, comparing the audio authentication result to an audio authentication result threshold, and comparing the audio liveliness authentication result to an audio liveliness authentication result threshold.

According to some example embodiments of inventive concepts disclosed herein, there are provided novel solutions for providing a multimodal authentication by a multimodal authentication device that relies on captured video and audio across a series of image/location combinations. The multimodal authentication device provides a significant improvement over traditional systems as the novel multimodal authentication device not only uses captured audio and video but also determines a liveliness associated with the audio and video. By providing such enhanced authentications, security risks associated with a false authentication are reduced or eliminated. For example, home automation systems, voice assistant devices, telehealth systems, etc. are improved by providing a reliable authentication.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included

What I claim is:

1. A multimodal authentication device to provide a multimodal authentication, comprising:
   a memory storing one or more computer-readable instructions; and
   a processor configured to execute the one or more computer-readable instructions to perform one or more operations to:
      receive, from a user, a request for access to any of one or more devices, one or more services, one or more resources associated with the multimodal authentication device, or any combination thereof;
      display one or more images at one or more locations of a display device associated with the multimodal authentication device;
      receive one or more user images of the user in response to the display of the one or more images, wherein the user image is received from an image capture device associated with the multimodal authentication device;
      receive one or more user audio inputs in response to the display of the one or more images, wherein the user audio is received from an audio capture device;
      determine a visual authentication based on the one or more user images;
      determine a visual liveliness authentication based on a tracking of the one or more user images to the display of the one or more images;
      determine an audio authentication based on the one or more user audio inputs;
      determine an audio liveliness authentication based on a comparison of a first timestamp associated with one or more lip movements of the user from the one or more user images and a second timestamp associated with a start of a command from the one or more user audio inputs; and
      provide a multimodal authentication based on the visual authentication, the visual liveliness authentication, the audio authentication, and the audio liveliness authentication so that the user has the requested access.

2. The multimodal authentication device of claim 1, wherein the processor is further configured to execute the one or more computer-readable instructions to perform one or more further operations to:
   generate a location random number series, wherein the one or more locations are based on the location random number series; and
   generate an image random number series, wherein the one or more images are based on the image random number series.

3. The multimodal authentication device of claim 1, wherein the processor is further configured to execute the one or more computer-readable instructions to perform one or more further operations to:
   set a visual authentication result based on the visual authentication;
   set a visual liveliness authentication result based on the visual liveliness authentication;
   set an audio authentication result based on the audio authentication; and
   set an audio liveliness authentication result based on the audio liveliness authentication.

4. The multimodal authentication device of claim 3, wherein the processor is further configured to execute the one or more computer-readable instructions to perform one or more further operations to:
   compare the visual authentication result to a visual authentication result threshold;
   compare the visual liveliness authentication result to a visual liveliness authentication threshold;
   compare the audio authentication result to an audio authentication result threshold; and
   compare the audio liveliness authentication result to an audio liveliness authentication result threshold, wherein providing the multimodal authentication is further based on each of the comparisons.

5. The multimodal authentication device of claim 1, wherein the determining the visual liveliness authentication comprises at least one of:
   determining a face angle associated with the one or more user images; and
   determining a gaze angle associated with the one or more user images.

6. The multimodal authentication device of claim 5, wherein the determining the visual liveliness authentication further comprises at least one of:
   determining that the face angle tracks the displaying of the one or more images at each of the one or more locations; and
   determining that the gaze angle tracks the displaying of the one or more images at each of the one or more locations.

7. The multimodal authentication device of claim 1, wherein the processor is further configured to execute the one or more computer-readable instructions to perform one or more further operations to:
   provide one or more instructions at the display device;
   receive a user input in response to the displaying the one or more instructions; and
   wherein the displaying the one or more images is based on the user input.

8. A method for a multimodal authentication device to provide a multimodal authentication, the method comprising:
   receiving, from a user, a request for access to any of one or more devices, one or more services, one or more resources associated with the multimodal authentication device, or any combination thereof;
   displaying one or more images at one or more locations of a display device associated with the multimodal authentication device;
   receiving one or more user images of the user in response to the display of the one or more images, wherein the user image is received from an image capture device associated with the multimodal authentication device;
   receiving one or more user audio inputs in response to the display of the one or more images, wherein the user audio is received from an audio capture device;
   determining a visual authentication based on the one or more user images;
   determining a visual liveliness authentication based on a tracking of the one or more user images to the display of the one or more images;

determining an audio authentication based on the one or more user audio inputs;

determining an audio liveliness authentication based on a comparison of a first timestamp associated with one or more lip movements of the user from the one or more user images and a second timestamp associated with a start of a command from the one or more user audio inputs; and providing a multimodal authentication based on the visual authentication, the visual liveliness authentication, the audio authentication, and the audio liveliness authentication so that the user has the requested access.

9. The method of claim 8, further comprising:

generating a location random number series, wherein the one or more locations are based on the location random number series; and generating an image random number series, wherein the one or more images are based on the image random number series.

10. The method of claim 8, further comprising:

setting a visual authentication result based on the visual authentication;

setting a visual liveliness authentication result based on the visual liveliness authentication;

setting an audio authentication result based on the audio authentication; and setting an audio liveliness authentication result based on the audio liveliness authentication.

11. The method of claim 10, wherein providing the multimodal authentication comprises:

comparing the visual authentication result to a visual authentication result threshold;

comparing the visual liveliness authentication result to a visual liveliness authentication threshold;

comparing the audio authentication result to an audio authentication result threshold; and comparing the audio liveliness authentication result to an audio liveliness authentication result threshold.

12. The method of claim 8, wherein determining the visual liveliness authentication comprises at least one of:

determining a face angle associated with the one or more user images; and determining a gaze angle associated with the one or more user images.

13. The method of claim 12, wherein determining the visual liveliness authentication further comprises at least one of:

determining that the face angle tracks the displaying of the one or more images at each of the one or more locations; and determining that the gaze angle tracks the displaying of the one or more images at each of the one or more locations.

14. The method of claim 8, further comprising:

providing one or more instructions at the display device;

receiving a user input in response to the displaying the one or more instructions; and wherein the displaying the one or more images is based on the user input.

15. A non-transitory computer-readable medium of a multimodal authentication device storing one or more instructions for providing a multimodal authentication, which when executed by a processor of the multimodal authentication device, cause the multimodal authentication device to perform one or more operations comprising:

receive, from a user, a request for access to any of one or more devices, one or more services, one or more resources associated with the multimodal authentication device, or any combination thereof;

displaying one or more images at one or more locations of a display device associated with the multimodal authentication device;

receiving one or more user images of the user in response to the display of the one or more images, wherein the user image is received from an image capture device associated with the multimodal authentication device;

receiving one or more user audio inputs in response to the display of the one or more images, wherein the user audio is received from an audio capture device;

determining a visual authentication based on the one or more user images;

determining a visual liveliness authentication based on a tracking of the one or more user images to the display of the one or more images;

determining an audio authentication based on the one or more user audio inputs;

determining an audio liveliness authentication based on a comparison of a first timestamp associated with one or more lip movements of the user from the one or more user images and a second timestamp associated with a start of a command from the one or more user audio inputs; and providing a multimodal authentication based on the visual authentication, the visual liveliness authentication, the audio authentication, and the audio liveliness authentication so that the user has the requested access.

16. The non-transitory computer-readable medium of claim 15, the one or more instructions when executed by the processor further cause the multimodal authentication device to perform one or more further operations comprising:

generating a location random number series, wherein the one or more locations are based on the location random number series; and generating an image random number series, wherein the one or more images are based on the image random number series.

17. The non-transitory computer-readable medium of claim 15, the one or more instructions when executed by the processor further cause the multimodal authentication device to perform one or more further operations comprising:

setting a visual authentication result based on the visual authentication;

setting a visual liveliness authentication result based on the visual liveliness authentication;

setting an audio authentication result based on the audio authentication; and setting an audio liveliness authentication result based on the audio liveliness authentication.

18. The non-transitory computer-readable medium of claim 17, the one or more instructions when executed by the processor further cause the multimodal authentication device to perform one or more further operations comprising:

comparing the visual authentication result to a visual authentication result threshold;

comparing the visual liveliness authentication result to a visual liveliness authentication threshold;

comparing the audio authentication result to an audio authentication result threshold; and comparing the audio liveliness authentication result to an audio liveliness authentication result threshold, wherein providing the multimodal authentication is further based on each of the comparisons.

19. The non-transitory computer-readable medium of claim 17, the one or more instructions when executed by the processor further cause the multimodal authentication device to perform one or more further operations comprising:
providing one or more instructions at the display device;
receiving a user input in response to the displaying the one or more instructions; and
wherein the displaying the one or more images is based on the user input.

20. The non-transitory computer-readable medium of claim 15, wherein determining the visual liveliness authentication comprises at least one of:
determining a face angle associated with the one or more user images;
determining a gaze angle associated with the one or more user images; and
determining that the face angle and the gaze angle tracks the displaying of the one or more images at each of the one or more locations.

\* \* \* \* \*